P. M. WILDY.
COOKING UTENSIL.
APPLICATION FILED FEB. 15, 1915.
1,259,183.
Patented Mar. 12, 1918.
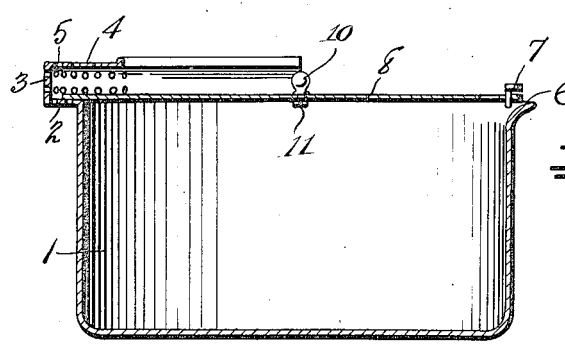
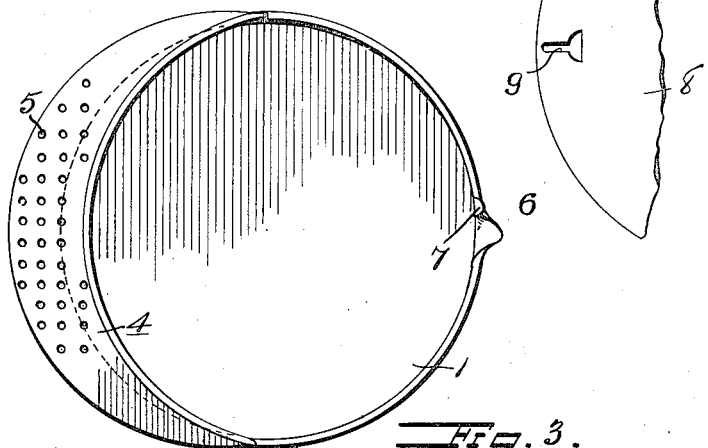
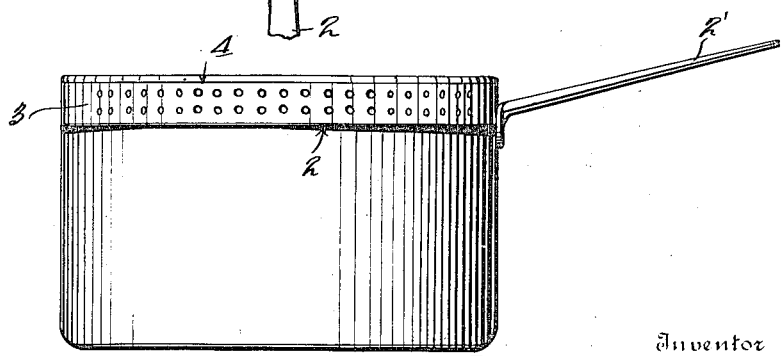
Witnesses
Edw. S. Hall.
Carroll Bailey
Inventor
Pearl M. Wildy.
By Richard Owen
Attorney

UNITED STATES PATENT OFFICE.

PEARL M. WILDY, OF NEW ATHENS, ILLINOIS.

COOKING UTENSIL.

1,259,183.  Specification of Letters Patent.  Patented Mar. 12, 1918.

Application filed February 15, 1915. Serial No. 8,363.

*To all whom it may concern:*

Be it known that I, PEARL M. WILDY, a citizen of the United States, residing at New Athens, in the county of St. Clair and State of Illinois, have invented certain new and useful Improvements in Cooking Utensils, of which the following is a specification.

This invention relates to cooking utensils, and more particularly to improvements in pots and lids therefor, whereby the lid is securely held in place upon the pot.

An object of the invention resides in providing one side of the top of the pot with an offset perforated extension to act as a strainer when pouring the contents from the pot, and to provide means to accommodate the lid in any secured relation to the pot.

Another object is to provide novel and efficient means to hold one side of the lid in secured engagement with the pot while the opposite side of said lid may be automatically moved so as to effect communication between the strainer and the interior of the pot.

Another object of the invention is to provide for quickly and easily removing the lid, when desired, but which lid is automatically locked in engagement with the pot when said pot is tilted to pour its contents through said strainer.

Another object of the invention is to provide means for limiting movement of the lid in the direction for establishing communication between the strainer and the interior of the pot.

With these and other objects in view the invention consists in the novel features of construction, combination and arrangement of parts as will be hereinafter more fully described, illustrated in the accompanying drawings and claimed.

In the drawings:—

Figure 1 is a vertical sectional view;

Fig. 2 is a top plan view;

Fig. 3 is a side elevation;

Fig. 4 is a detail view of a portion of the cover.

Referring to the drawings by numerals, 1 designates a metal pot which is formed in the usual manner and which is provided with the ordinary handle 2'. One side of the pot, at its upper edge, is extended laterally a suitable distance, as at 2, upwardly as at 3 and inwardly as at 4, the inwardly extending portion 4 extending within the plane of the side of the pot, a distance substantially equal to the distance of the laterally extending portion 2. The portions 2, 3 and 4 extend upon the upper edge of the pot, substantially one half the circumference thereof, perforations 5 being provided in the said portions in order to form a strainer which is effective when the pot is tilted to pour the contents thereof.

From the foregoing it will be seen that the strainer constitutes a curved or crescent-shaped chamber or recess which overhangs one side of the pot, and that the element 2 has its upper surface coinciding with the upper edge of the pot, so that the lid 8, when on said pot, lies flat upon said element 2 and interrupts communication between the strainer and the interior of the pot. However, when the pot is tilted for pouring its contents through the strainer, the free edge of the lid which extends into said strainer is automatically moved, by the pressure of the contents thereagainst, until said free edge is stopped by its contact with the portion 4, which latter is substantially parallel with and spaced apart from the element 2 and from the upper edge of the pot. The lid is provided with an ordinary handle or knob 10, secured in place by ordinary means, such, for instance, as the nut 11.

The side of the pot opposite to the perforated extensions is provided with a pouring lip 6, and the upper edge of the pot, adjacent said lip, is provided with a headed stud 7. A lid 8 is adapted to be placed upon the top of the pot, and is adapted to be held securely thereon by means of an aperture 9 which engages beneath the head 7, the aperture being formed in the shape of a semicircle having an elongated slot extending from the rounded edge thereof, and the headed stud 7 being formed in the shape of a semicircle and is adapted to be inserted within and passed through the semicircularly shaped portion of the aperture 9, whereupon the cover may be moved to bring the sides and closed end of the elongated slot beneath the head 7.

From the foregoing description taken in connection with the accompanying drawings it is thought that the construction and operation of the device will be clearly understood and while I have herein shown and described one specific form of my invention I do not wish to be limited thereto, except for such limitations as the claims may import.

What is claimed:—

1. The combination of a pot, a strainer secured on said pot and over-hanging the top thereof at one side, a lid normally fitted on said pot, and means for movably securing one side of said lid to the corresponding side of the pot while its opposite edge normally interrupts communication between said pot and said strainer, said lid being arranged for movement in such manner as to effect communication between said strainer and the interior of said pot while remaining secured by said means, said strainer being provided with means for limiting said movement of the lid, whereby the steam which rises from the pot is reduced to the minimum.

2. The combination of a pot, a strainer united with said pot at one side of its upper end and extending thereabove and terminating in a normally horizontal portion, a lid normally fitted on the top of the pot and having one edge provided with an aperture and having its other edge extended under said horizontal portion, and a headed securing element united with the pot at the side opposite to said strainer, said headed securing element being extended through said aperture so as to hold the adjacent edge of said lid substantially in fixed position when the pot is tilted for pouring its contents through said strainer while the opposite side of said lid is movable by pressure of said contents thereagainst until it is stopped by contact thereof with said horizontal portion.

3. The combination of a pot, a strainer united with the upper edge of said pot at one side thereof and provided with a normally horizontal portion spaced above the top of said pot, and a lid provided with a handle and being removably secured to said pot at the side thereof opposite to said strainer, said lid being also adapted to swing in the direction of said normally horizontal portion when the contents of the pot are being poured while the secured edge of the lid remains substantially in fixed position.

In testimony whereof I affix my signature in presence of two witnesses.

PEARL M. WILDY.

Witnesses:
 THEO. E. KIRCHER,
 R. D. W. HOLDER.